US012412293B2

(12) United States Patent
Mcfarland

(10) Patent No.: US 12,412,293 B2
(45) Date of Patent: Sep. 9, 2025

(54) SYSTEM AND METHOD OF SCORING ANIMALS

(71) Applicant: Charles Mcfarland, Tremonton, UT (US)

(72) Inventor: Charles Mcfarland, Tremonton, UT (US)

( * ) Notice: Subject to any disclaimer, the term of this patent is extended or adjusted under 35 U.S.C. 154(b) by 327 days.

(21) Appl. No.: 18/140,117

(22) Filed: Apr. 27, 2023

(65) Prior Publication Data

US 2024/0029290 A1  Jan. 25, 2024

Related U.S. Application Data

(60) Provisional application No. 63/391,946, filed on Jul. 25, 2022.

(51) Int. Cl.
| | | |
|---|---|---|
| *G06T 7/62* | (2017.01) | |
| *G06F 3/04817* | (2022.01) | |
| *G06F 3/0482* | (2013.01) | |
| *G06V 10/74* | (2022.01) | |
| *G06V 40/10* | (2022.01) | |

(52) U.S. Cl.
CPC ............ *G06T 7/62* (2017.01); *G06F 3/04817* (2013.01); *G06F 3/0482* (2013.01); *G06V 10/761* (2022.01); *G06V 40/10* (2022.01); *G06T 2207/20132* (2013.01)

(58) Field of Classification Search
CPC .......... G06T 7/62; G06V 10/761; G06V 4/10; G06F 3/04817; G06F 3/0482
USPC ....................................................... 382/286
See application file for complete search history.

(56) References Cited

U.S. PATENT DOCUMENTS

| | | | |
|---|---|---|---|
| 8,483,446 B2* | 7/2013 | Demarais | G06T 7/62 |
| | | | 382/110 |
| 9,842,277 B2* | 12/2017 | Demarais | G06V 40/10 |
| 10,591,282 B2* | 3/2020 | Krien | G06T 7/62 |
| 11,328,822 B2* | 5/2022 | Ellison | G16H 50/30 |
| 2002/0170201 A1 | 11/2002 | Trout et al. | |
| 2006/0002553 A1* | 1/2006 | Krien | G01B 11/22 |
| | | | 380/245 |
| 2007/0198115 A1* | 8/2007 | Krien | G06T 7/62 |
| | | | 700/98 |
| 2009/0135402 A1* | 5/2009 | Krien | G06T 7/62 |
| | | | 382/103 |
| 2011/0311109 A1* | 12/2011 | Demarais | G06T 7/0012 |
| | | | 382/110 |
| 2013/0103345 A1* | 4/2013 | Krien | G06T 7/62 |
| | | | 702/155 |
| 2014/0012861 A1* | 1/2014 | Bradsher | G06F 16/958 |
| | | | 715/753 |
| 2016/0140706 A1* | 5/2016 | Demarais | G06T 7/62 |
| | | | 382/110 |

(Continued)

*Primary Examiner* — William D Titcomb

(57) ABSTRACT

A system includes a smart device, cloud platform, and an application on the smart device. The smart device via the application may communicate with the cloud platform, which in turn, communicates with the smart device. The application allows a user to upload or capture images of antlers, horns, etc. and select the type of animal to be scored. Once the image is selected, it is sent to the cloud platform, where it is broken into separate cropped sections. Each section may contain a tine and one section may contain the main beam. Accordingly, each portion of antler is measured. The completed measurements are then sent to the smart device as a score for the animal.

20 Claims, 8 Drawing Sheets

(56) References Cited

U.S. PATENT DOCUMENTS

2019/0378621 A1* 12/2019 Ellison .................... G06F 3/011

* cited by examiner

SYSTEM AND METHOD OF SCORING ANIMALS

CROSS-REFERENCE TO RELATED APPLICATIONS

This application claims the benefit of U.S. Provisional Application Ser. No. 63/391,946, filed on Jul. 25, 2022, which is incorporated herein by reference.

TECHNICAL FIELD

The present disclosure relates to an animal scoring system. More particularly, the present disclosure relates to a mobile application on a smart device that can measure the size and/or score of animals.

BACKGROUND

Hunting and wildlife observation have been an important part of the world and conservation for many years. Scoring animals based upon their size has helped conservationists to protect animals and promote conservation. Specifically, scoring animals allows conservationists the ability to know the health and genetics of a species in a particular region. Knowing this information leads to informed decisions on the number of animals that may be taken by sportsman, and in some situations, whether or not steps need to be taken to protect the species in that area.

Furthermore, conservation programs are helped by the money received from the numerous scoring systems. The owners of these systems often pay considerable amounts of money to conservation organizations. Scoring animals also helps individuals know the variations in a single species across the country or world. For many, it is exciting to know the size of the animal and to know the potential of harvesting a trophy in a given area based upon scores of other harvested animals in that area. Animals may be scored numerous ways, with scoring typically being uniform for each species. For example, bears may be scored by taking multiple measurement of its skull, while an ungulate, like elk, may be scored by taking multiple measurements of its antlers, including length and mass. These measurements are performed with tape measures for most animals and calipers are often used for bears and mountain lions, when skulls are measured.

There are multiple scoring systems used to measure an animal. Some of these systems include Pope and Young, Boone and Crockett®, and Safari Club International®. These systems focus on different animals and different methods of take. One thing that these scoring systems have in common is that they all require a physical measuring device, such as a tape measure, in order to score an animal. Each of these systems typically include a score sheet so that a user may tally each measurement in order to obtain the gross and net score of the animal. Due to the numerous measurements that have to be made to obtain a score, it is extremely difficult to score animals correctly. Accordingly, many individuals have to rely on official scorers and their expertise to receive an accurate or official score for their animal. This often is time consuming and may become expensive over time.

Accordingly, there is a need for a system and method for scoring animals without the need of a physical measuring device and for a system that allows lay users to obtain accurate scores for their animals. The present invention seeks to solve these and other problems.

SUMMARY OF EXAMPLE EMBODIMENTS

In one embodiment, a system comprises a smart device, a cloud platform, and an application (e.g., mobile or software) on the smart device. The smart device may be a smart phone, tablet, or any other computing device. The smart device may comprise a display, a processor, memory, a camera, and storage. The smart device via the application may communicate with the cloud platform, which in turn, communicates with the smart device. The cloud platform may comprise stored data and other features necessary to operate the application. The application may comprise a main user interface having a user identification icon. The main user interface may comprise images of past antler submissions and their score cards. An addition icon may be present on the main user interface that allows a user to select a target antler to upload to the cloud platform.

Once a user selects the addition icon, a menu may populate that allows a user to choose a photo. In some embodiments, the menu may produce a tab that allows a user to select either to score a single antler or to select a tab that allows a set of antlers to be scored. The menu may also comprise options to choose a left antler from a smart device photo storage system, a right antler from the smart device photo storage system, a capture left antler, and a capture right antler. The capture left and right antlers allows a user to utilize the camera of the smart device to take a photo via the software application instead of uploading an image from the smart device photo storage system. After the image is uploaded or captured, the user may select a score icon that communicates the information to the cloud platform. The score icon may produce a second user interface that allows the user to select the species of the uploaded image.

The application may produce a third user interface screen (e.g., a score card of the antler(s)). The third user interface may show the antler and a score sheet. The score sheet may describe the measurement system of the selected species and the actual measurements of the analyzed antler(s). Accordingly, the score sheet allows a user to know the score of the uploaded or captured image. The software application may be integrated with the native device. As such the application may be native, meaning the application is designed for a specific operating system such as iOS or Android. In some embodiments, the application may be hybrid. In some embodiments, the application may be a web app.

In one embodiment, a method of scoring an antler via a system and method of scoring animals comprises opening a software application on a smart device. A user may select an addition icon to open up a menu. Selecting from the menu whether to measure a single antler or a set of antlers and whether to access stored images or capture an image via the smart device's camera at step. The user may select a score icon that matches the antler type to its species. This allows a user to send correct information to the cloud platform so as to produce the most correct result. Artificial Intelligence (AI) on the cloud platform analyzes the image and compares it to stored data. The analyzed images with scores are sent to the smart device, where a user may access the information on a third interface via the application.

DETAILED DESCRIPTION OF EXAMPLE EMBODIMENTS

Figure 1:
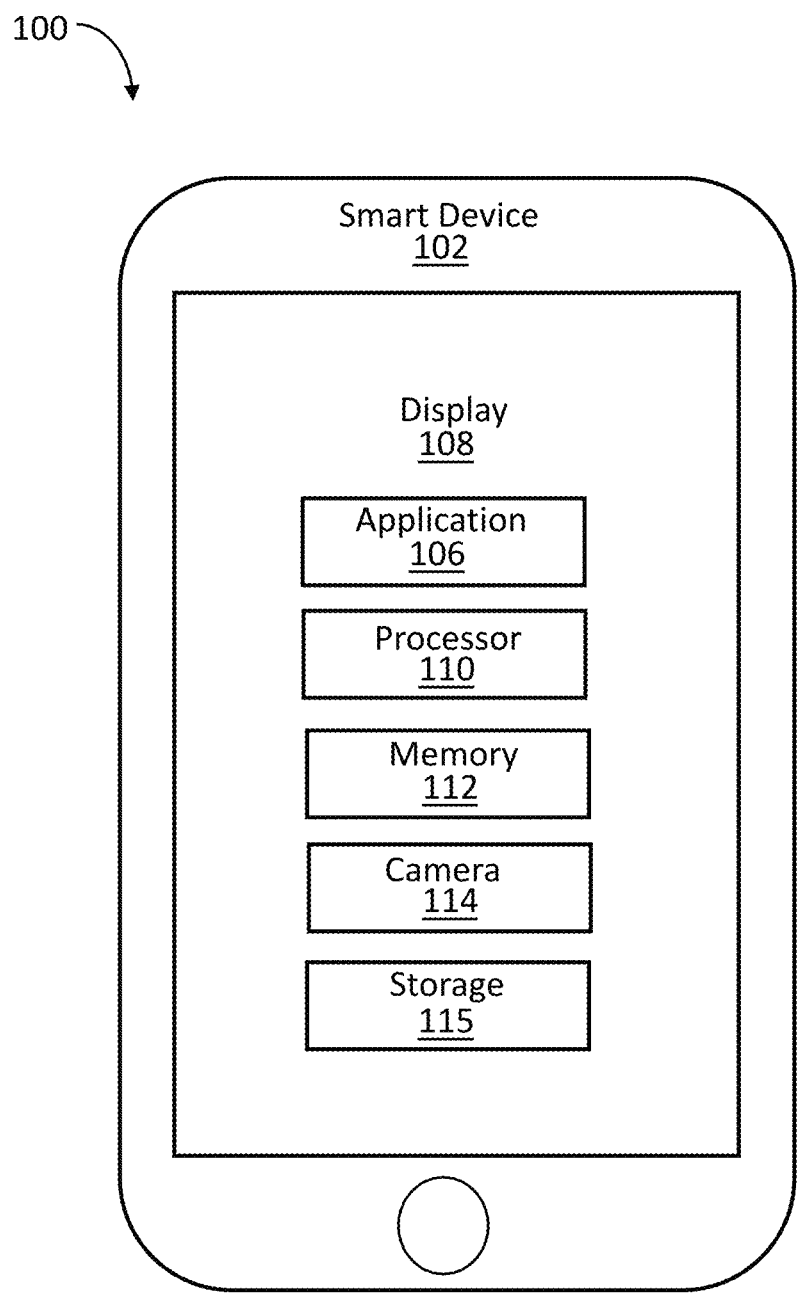
FIG. 1 illustrates a smart device of a system and method of scoring animals.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

Portions of the system and method for scoring animals may be implemented wholly in hardware, wholly in software or combining software and hardware implementation that may all generally be referred to herein as a "circuit," "module," "component," or "system." It will be understood that computer program code for carrying out operations for features of the system and method of scoring animals on a smart device may be written in any programming language, which may include, but is not limited to, Objective-C, C++, C#, VB.NET, Java, Python, "C" programming language, Visual Basic, Perl, COBOL 2002, PHP, ABAP, Python, PHP, HTML, AJAX, or Ruby and Groovy. The program code may operate any portion of the system.

Portions of the system are illustrated in flowcharts and/or block diagrams. These flowcharts and/or block diagrams depict computer and mobile application program products according to embodiments of the system described herein. It will be understood that each block of the flowchart illustrations and/or block diagrams, and combinations of blocks in the flowchart illustrations and/or block diagrams, can be implemented by computer or mobile application program instructions.

As previously described, there is a need for a system and method for scoring animals without the need of a physical measuring device and for a system that allows lay users to obtain accurate scores for their animals. The present invention seeks to solve these and other problems.

Scoring animals to determine their size has been important to hunters and conservationists for years. Various measuring systems have been put in place to score North American animals all the way to African animals. Some of these systems include Pope and Young, Boone and Crockett®, and Safari Club International®. All of these scoring systems have one thing in common: they all require a trained scorer utilizing a physical measuring device, such as a tape measure. That is, the individual scorer needs to fully understand the scoring system and how to properly measure to obtain an accurate score. Due to the limited number of official scorers, it is hard for hunters and conservationists to find individuals to properly score their animals, and quickly score them.

The system and method to score animals described herein comprises a smart device, a cloud platform, and an application (e.g., mobile or software). The smart device may send images of antlers, horns, etc. from the application to the cloud platform. Once the selected image is sent to the cloud platform, the image is then broken into measurable components based on the scoring system and analyzed. The components are then compared to previously stored data relating to all antler sizes (e.g., length and circumference of previously uploaded antlers). Accordingly, the antler in the selected image is given a score and sent to the smart device, where a user can view the information and save it. It will be appreciated that the system herein does not require the use of a physical measuring device (e.g., tape measure) as found in the prior art. Instead of using a tape measure, a user may simply take a photo or use an image in storage of an antler and upload it into the system to produce an accurate score of the antler.

As shown in FIG. 1, in one embodiment, a system 100 comprises a smart device 102, cloud platform 104 (Shown in FIG. 5), and an application (e.g., mobile or software) 106 on the smart device 102. The smart device 102 may be a smart phone, tablet, or any other computing device, such as a computer. The smart device 102 may comprise a display 108 (e.g., a touch screen display), a processor 110, memory 112, a camera 114, and storage 115. The memory 112 may be RAM, such as LPDDR, LPDDR2, LPDDR3, LPDDR4, or any other variation of RAM. The memory 112 may also comprise ROM, such as EPROM or Flash EEPROM.

The smart device 102 via the application 106 may communicate with the cloud platform 104, which in turn, communicates with the smart device 102. The cloud platform 104 may comprise information storage (i.e., stored data) and other features necessary to operate the application 106. For example, the cloud platform may store big game animal scoring data on a server 116 on the cloud (Shown in FIG. 5). The server 116 may comprise the stored data, which may include lengths and circumferences of numerous antlers 117; lengths and circumferences of numerous horns; and animal body size measurements for a variety of species, skull width and length sizes for, for example, bears and mountain lions. It will also me understood that the stored data may include data on fish or any other type of species. The cloud platform 104 may also store other information pertinent to scoring big game animals. The cloud platform 104 may comprise the stored data (e.g., information of previously uploaded antlers) so as to compare and score new antler submissions submitted thereto and communicate an accurate score to the smart device 102. The server 116 on the cloud platform 104 may comprise artificial intelligence (AI) technology that analyzes each submitted photo, whether it is captured via the camera 114 or uploaded from the smart device storage 115. The AI can analyze each section of the antler to produce a score card as described below.

Figure 2:
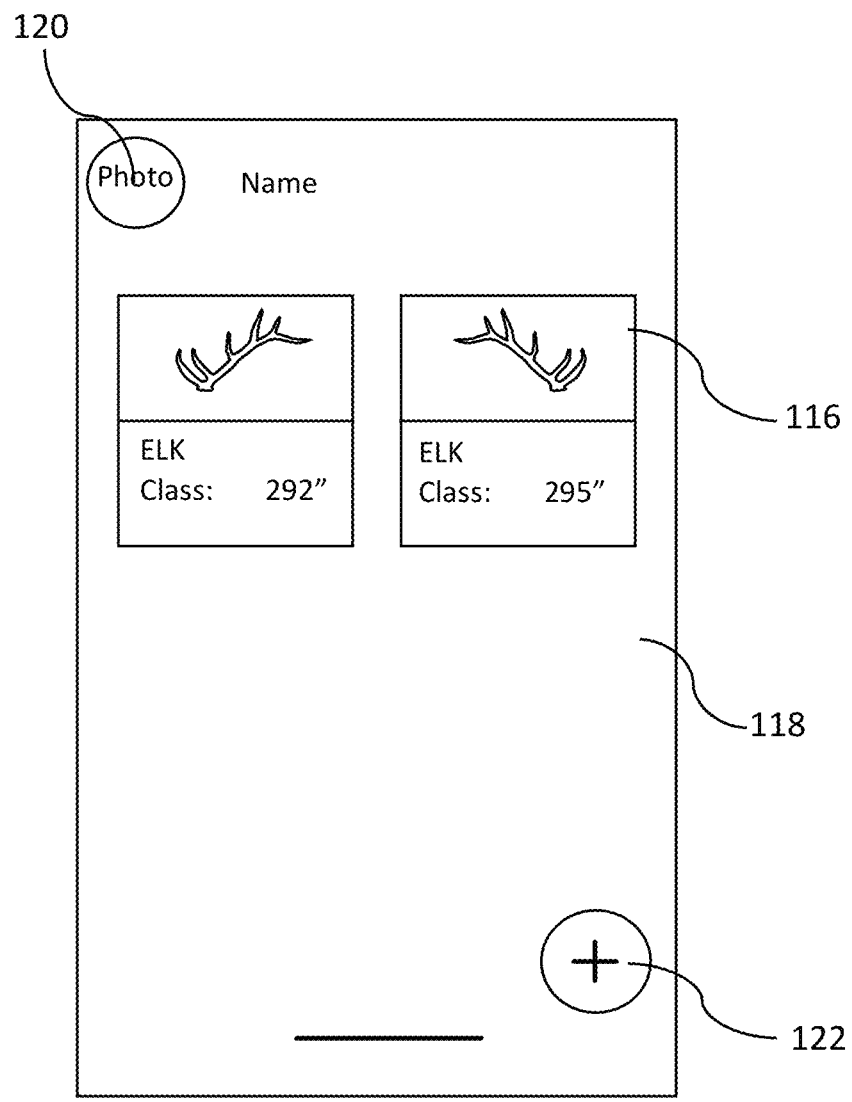
FIG. 2 illustrates a first, main interface of an application of a system and method of scoring animals.

As shown in FIG. 2, the application 106 may comprise a main user interface 118 having a user identification icon 120 on the display 108. The user identification icon 120 may allow a user to add personal information, such as a name, address, and/or a personal photo. When accessing the user identification icon, in some embodiments, a user may be able to allow the application 106 to access the GPS of the smart device, thereby allowing a user to mark the location of where the photo of the antler, whether a shed or connected to an animal, was taken. The main user interface 118 may display images of past submitted antlers and their scores that may be accessed. An addition icon 122 may be present on the main user interface 118 that allows a user to select a target antler or capture an image to upload to the cloud platform 104.

Figure 3:
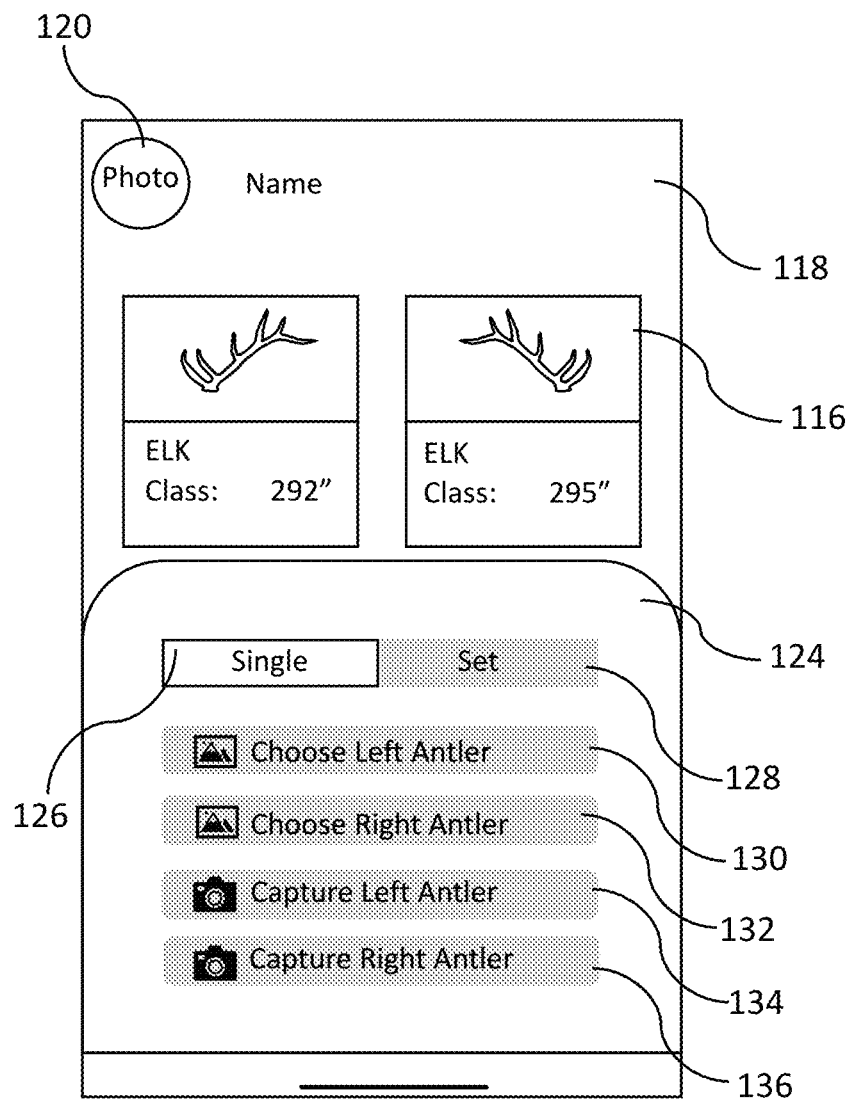
FIG. 3 illustrates a menu of an application of a system and method of scoring animals.

As shown in FIG. 3, once a user selects the addition icon 122, a photo menu 124 may appear which allows a user to choose a photo. In some embodiments, the photo menu 124 may produce a first tab 126 that allows a user to select to score a single antler or a second tab 128 that allows a user to select a set of antlers to be scored. The photo menu 124 may also comprise options to choose a left antler from the smart device photo storage 115 at first menu icon 130, a right antler from the smart device photo storage 115 at second menu icon 132, a capture left antler at third menu icon 134, and a capture right antler at fourth menu icon 136. The capture left and right antlers 134, 136 allows a user to utilize the camera 114 of the smart device 102 to take a photo utilizing the application 106 instead of uploading an image from the smart device photo storage 115. The camera 114 may be used in any camera mode the smart device 102 may offer, such as portrait or landscape. In some embodiments, the camera mode is set to portrait. In some embodiments, to capture an image, a user places the phone in portrait mode, captures an image of the antler 117 in horizontal framing, and uses a dark-colored background (discussed below). After the image or images are uploaded or captured, the user may select a score icon that communicates the information to the cloud platform 104. In particular, the score icon may produce a second user interface that allows the user to select the species of the uploaded or captured image. At this point, the smart device 102 communicates with the server 116 the cloud platform 104 and the cloud platform 104, where the image is analyzed.

Figure 4:
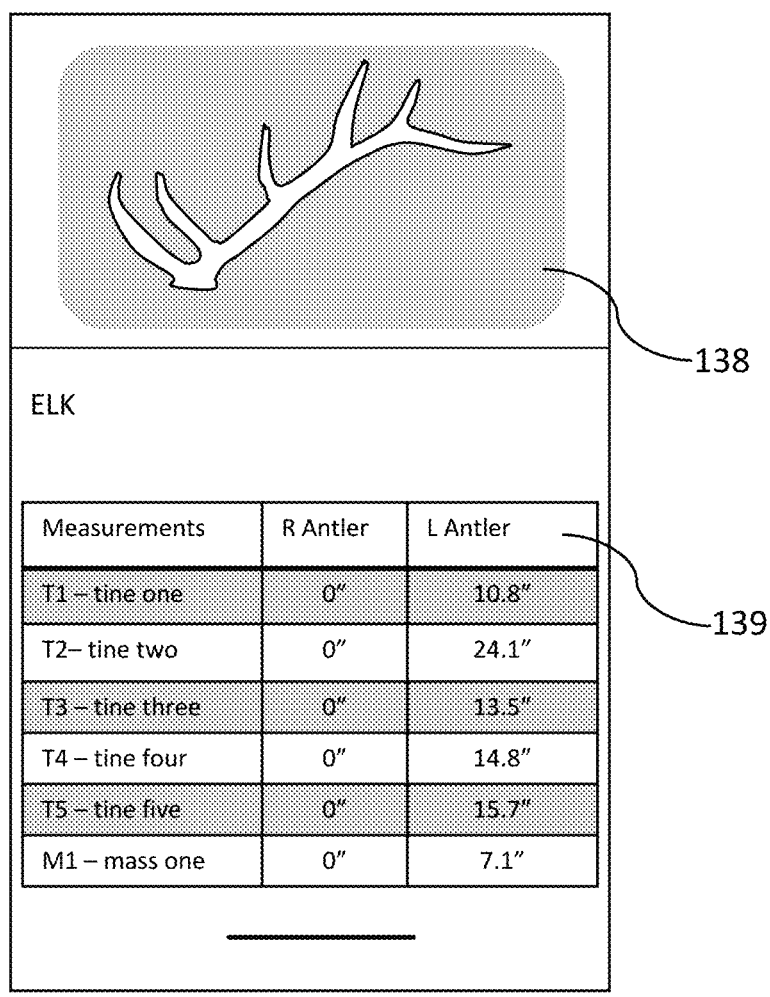
FIG. 4 illustrates a third user interface of an application of a system and method of scoring animals.

As shown in FIG. 4, once the image is analyzed, the application 106 may produce a third user interface screen 138 with a score card 139 (e.g., a score card of the antler(s)). The score card 139 may show the antler and a score sheet. The score sheet may describe the measurement system of the selected species and the actual measurements of the analyzed antler(s). Accordingly, the score sheet 139 allows a user to know the score of the uploaded or captured image.

Figure 5:
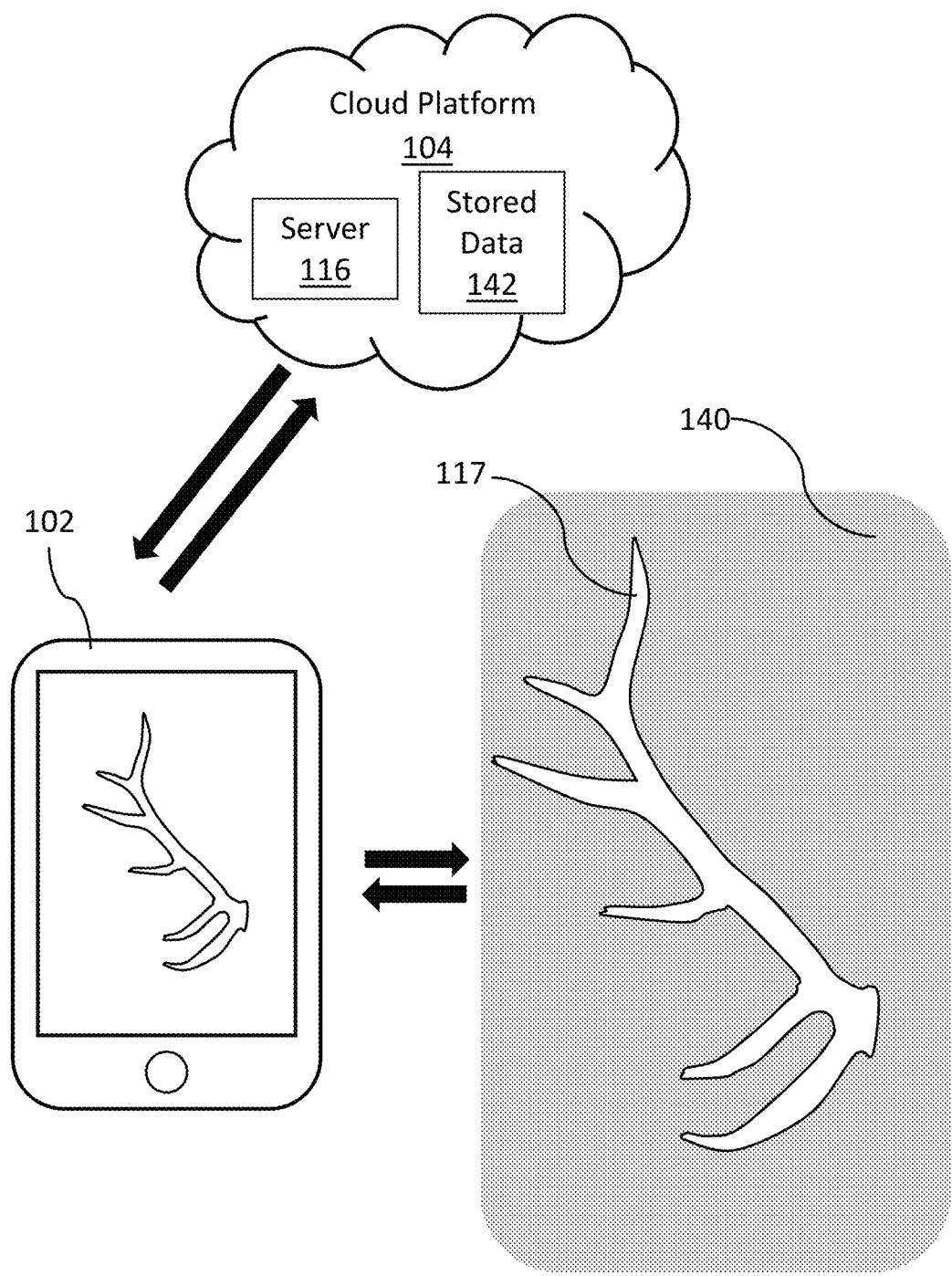
FIG. 5 illustrates a diagram of a system and method of scoring animals.
Figure 6:
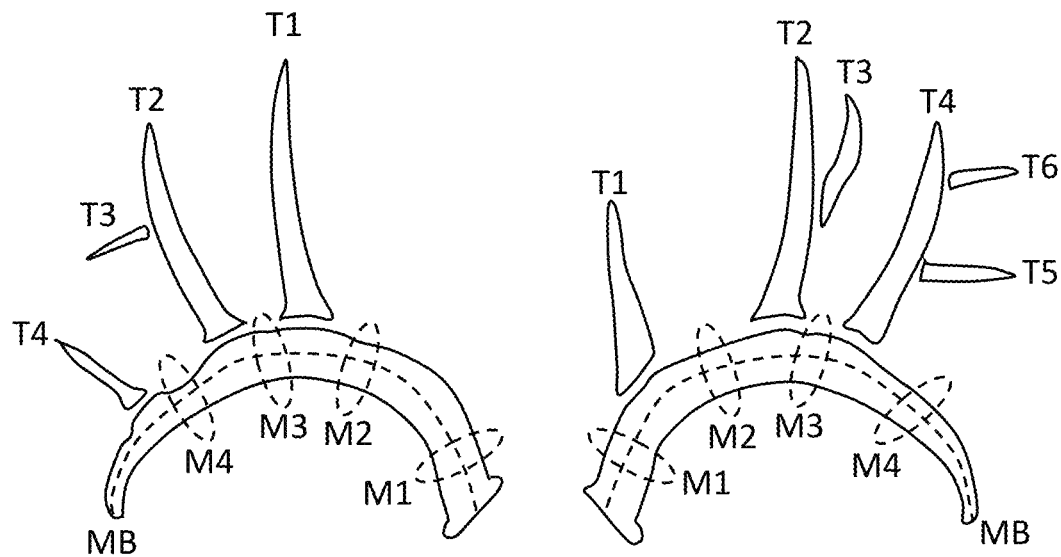
FIG. 6 illustrates a front elevation view of a set of antlers of a system and method of scoring animals.

As illustrated in FIGS. 5-6, the application 106 on the smart device may be configured to communicate with the camera 114 and/or the storage 115 on the smart device 102. As a user opens the application 106, the user may take a photo inside the application 106 or may upload a previously saved photo, either one that the user took or stored on storage 115, by pressing the addition icon 122, as described above. When taking a photo with the camera 114, a user may place the antler on a dark-colored background 140 (e.g., black mat) or any other dark background, such as a dark colored rug or asphalt road/driveway. The dark-colored background 140 allows the system 100 to analyze the antler 117, each tine and the main beam. Once the user selects how to upload a photo of an antler, a user may then upload the selected photo to the cloud platform 104. The selected photo may be a right or left antler, or in some embodiments, the selected photo may comprise a matching set of antlers. Artificial intelligence (AI), or other computing systems and software, located on the server 116 on the cloud platform 104 may recognize different antlers, horns, etc. and the species they belong to. At which point, the uploaded photo is cropped from the background 140 shown in the uploaded photo. The AI recognizes each tine of the antler and crops them from the main beam (i.e., the beam where tines extend from) of the antler. More particularly, in one embodiment, the server 116 may comprise numerous AI systems (e.g., ten) where three AI systems are used to classify (determine the species) and crop the antler from the image to be scored. Then multiple other AI systems, or the same, may be dedicated to each measurement group. As an example, there may be an AI system for T1, another AI system for the main beam, and another AI system for the other measurements. In some embodiments, the server 116 may comprise a single AI system to analyze the uploaded or captured antler. The cropped images may then be separated into tine cropped images and a main beam cropped image. The cloud platform 104, with the server 116, may then compare the tine cropped images and the main beam cropped image to the stored data 142 (i.e., previously uploaded antler data). After the comparison has occurred, the AI on the server 116 measures the uploaded antler so as to produce a score and/or make a prediction of the length and circumference of the tines in the tine cropped images and the main beam in the main beam cropped image. The measurement/prediction may then be sent from the cloud platform 104 and the server 116 to the smart device 102 to be viewed on the application 106, more particularly on the score card 139 found on the third user interface 138. The measurements (i.e., antler score) may then be placed on the score card 139 within the application 106. Once the score card 139 is produced, the user may be able to view the produced score and then save their score cards to the home screen, storage, or application 106 of the smart device 102.

FIG. 6 illustrates an example of the antler measurements analyzed by the AI systems. The AI systems analyzes the measurements of the tine cropped images and main beam cropped image. The tines may be counted in ascending order from the bur of the antler (i.e., where the antler attaches to the skull of the animal). The first branch off of the main beam closest to the burr is classified as T1 (Tine one). The following details the measurements of a whitetail deer antler that are measured by AI on the server 116: T1—tine one, measured from tip to intersection of main beam following the center line of the tine; T2—tine two, measured from tip to intersection of main beam following the center line of the tine; T3—tine three, measured from tip to intersection of main beam following the center line of the tine; T4—tine four, measured from tip to intersection of main beam following the center line of the tine; T5—tine five, measured from tip to intersection of main beam following the center line of the tine; T6—tine six, measured from tip to intersection of main beam following the center line of the tine; T7—tine six, measured from tip to intersection of main beam following the center line of the tine; M1—mass one, circumference of Main Beam taken midway between the Burr and T1; M2—mass two, circumference of main beam taken midway between T1 & T2; M3—mass three, circumference of main beam taken midway between T2 & T3 (if T3 is off main beam); M4—mass four, circumference of Main Beam taken midway between T3 & T4 (if T3 is off main beam). If no T4 is present, the M4 will be measured midway between the T3 and end of Main Beam. The main beam is measured from the end of the burr to the tip of the antler following the center line of the beam. After these measurements are taken, the total score, sum of all above measurements present on antler, is produced. In addition, the score may be categorized by class. In the case of single antler score cards, the class is calculated by (Total Score×2)+18" inside spread credit. In the case of a set of antlers, score card is calculated by Total Score of Right Antler+Total Score of Left Antler+18" inside spread credit. It will be understood that other species, such as mule deer and elk, may be analyzed in a similar manner.

The application 106 may be integrated with the native device. As such the application 106 may be native, meaning the application 106 is designed for a specific operating system such as iOS or Android. In some embodiments, the software application 106 may be hybrid. In some embodiments, the application 106 may be a web app.

Figure 7:
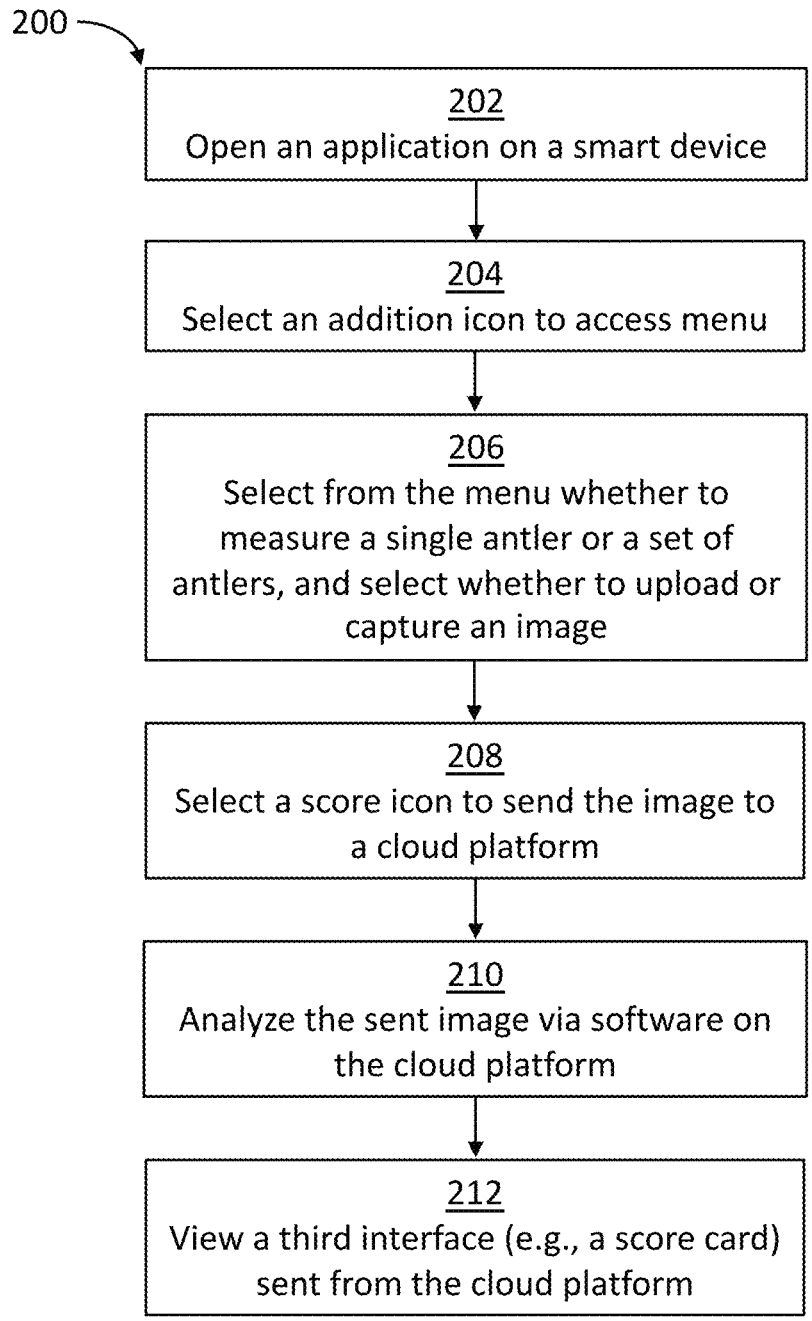
FIG. 7 illustrates a flowchart of a system and method of scoring animals.

In one embodiment, as shown in FIG. 7, a method of scoring an antler via a system and method of scoring animals 200 comprises opening an application on a smart device at step 202. At step 204, a user may select an addition icon to open up a menu. Selecting from the menu whether to measure a single antler or a set of antlers and whether to access stored images or capture an image via the smart device's camera at step 206. At step 208, the user may select a score icon that matches the antler type to its species. This allows a user to send correct information to be analyzed on the cloud platform and the server so as to produce the most accurate result. At step 210, AI on the cloud platform analyzes the image and compares it to stored data. That is, data that includes numerous antler measurements. At step 212, the analyzed images with scores are sent to the smart device, where a user may access the information on a third interface via the software application.

Figure 8:
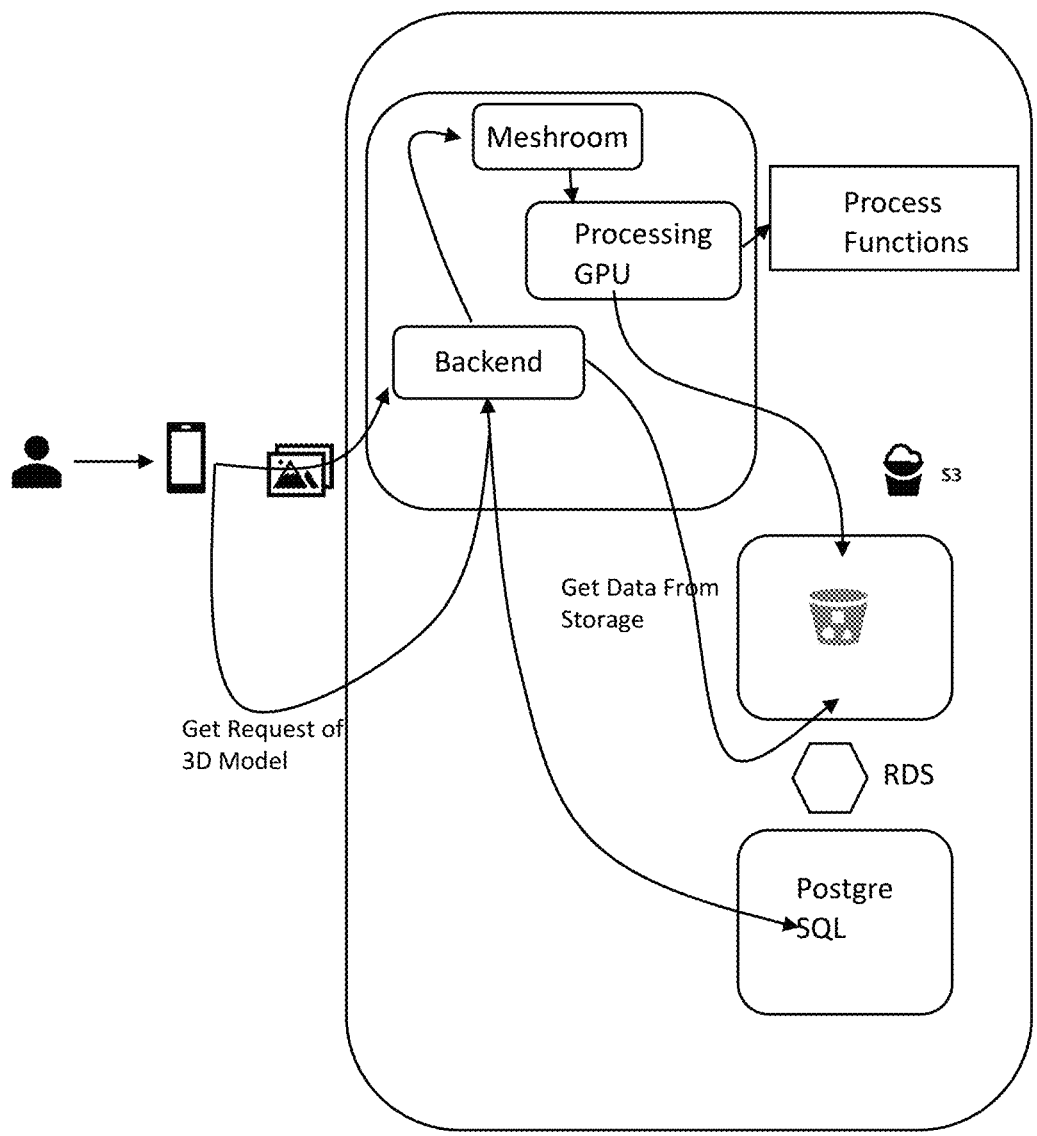
FIG. 8 illustrates a diagram of a system and method of scoring animals.

FIG. 8. illustrates a diagram of a system of scoring animals 300 comprising a smart device 302 with a mobile application 304. The mobile application 304 may comprise all features described in the mobile application described in the above embodiments. The mobile application 304 may comprise a function that allows users to upload a video of a scorable object, such as an antler, deadhead, fish, or any other type of game animal. Then the scorable object may be converted into a three-dimensional image that is viewable in augmented reality. More particularly, a user may upload a short 360-degree video of the scorable object. At this point, the image processing engine captures a series of photos throughout the videos. The series of photos may include 100-200 images. However, in some embodiments, more or less than 100-200 images may be used. These images are then passed through a three-dimensional reconstruction software (e.g., Meshroom) which helps reconstruct the three-dimensional object based off of the series of photos. To use Meshroom, we need to provide it with a set of images that capture the object or scene from different viewpoints. Meshroom then uses a series of algorithms to extract information from these images and construct a 3D model. The process involves several steps, including feature extraction, camera calibration, 3D point cloud generation, and surface reconstruction. After this occurs, a user may view the three-dimensional scorable object and rotate the object in augmented reality. In particular, the three-dimensional object is viewable within the augmented reality viewer on the smart device 302. The augmented reality viewer may scale the three-dimensional object as well as allow a user to rotate the object to view from any angle. The three-dimensional object may be set at 100% scale or, in other words, to the actual size of the scorable object. The three-dimensional objects may then be shared within the mobile application 304. In some embodiments, the three-dimensional image may be shared to a social media page where other users, having the mobile application, can view the scorable object in their augmented-reality viewer via the mobile application 304.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A system for measuring antler size comprising:
   a smart device that captures and stores, in a memory, images of one or more antlers, the smart device comprising a mobile application and a camera;
   a cloud platform;
   the mobile application comprising a main user interface;
   the mobile application programmed to:
      capture an image with the camera of an antler or set of antlers or upload a stored image of an antler or set of antlers;
      provide a score icon that produces a second user interface that includes options for one or more species to be selected;
      communicate with and send either the captured image or the stored image to the cloud platform, the cloud platform programmed to analyze and compare the captured image or the stored image to stored data, the cloud platform sends a score card to the mobile application;
produce a third user interface that comprises the score card that describes antler measurements of the captured image or the stored image; and
save the score card to the main user interface.

2. The system for measuring antler size of claim 1, wherein the smart device comprises a touchscreen display, one or more processors, one or memories, and storage.

3. The system for measuring antler size of claim 1, wherein the main user interface comprises a user identification icon and an addition icon that allows access to images of one or more antlers stored on the smart device.

4. The system for measuring antler size of claim 1, wherein the cloud platform comprises a server.

5. The system for measuring antler size of claim 4, wherein in response to receiving either the captured image or stored image, software on the server crops the uploaded photo from a dark-colored background, a main beam and each tine of the antler is recognized and cropped from the main beam, tine cropped images and a main beam cropped image is produced, and all cropped images are then compared to stored data on the cloud platform to produce length and circumference measurements.

6. The system for measuring antler size of claim 4, wherein the server comprises artificial intelligence to analyze the captured image or stored image.

7. The system for measuring antler size of claim 1, wherein the smart device comprises a smart phone or a tablet.

8. The system for measuring antler size of claim 1, wherein the smart device is set to capture images of the antler or set of antlers in portrait mode.

9. The system for measuring antler size of claim 1, wherein the mobile application further comprises a photo menu that includes a first tab that provides a user an option to select to score the single antler and a second tab that provides the user to select the set of antlers to be scored.

10. The system for measuring antler size of claim 9, wherein the photo menu further allows the user to choose between a first menu icon, the stored image of a left antler; a second menu icon, the stored image of a right antler; a third menu icon, capture the image of a left antler; or a fourth menu icon, capture the image of a right antler.

11. The system for measuring antler size of claim 1, wherein the main user interface displays images of past score cards that may be accessed.

12. The system for measuring antler size of claim 1, further comprising a dark-colored background where the antler or set of antlers is placed prior to capturing the image.

13. A system for measuring antler size comprising:
a smart device that captures and stores images of one or more antlers, the smart device comprising a display, a processor, memory, a camera, storage, and a mobile application;
a cloud platform comprising a server;
a dark-colored background that receives the one or more antlers;
the mobile application comprising a main user interface having a user identification icon and an addition icon that allows access to images of one or more antlers stored on the smart device;
the mobile application programmed to:
capture an image with the camera in portrait mode of an antler or set of antlers or upload a stored image of an antler or set of antlers;
select a score icon that produces a second user interface that includes options for one or more species;
communicate with and send either the captured image or the stored image to the server on the cloud platform, the server programmed to analyze and compare the captured image or the stored image to stored data based upon selected species and send a score card to the mobile application;
produce a third user interface that comprises the score card that describes antler measurements of the captured image or the stored image.

14. The system for measuring antler size of claim 13, wherein the mobile application further comprises a photo menu that includes a first tab that provides a user to select to score a single antler and a second tab that provides the user to select a set of antlers to be scored.

15. The system for measuring antler size of claim 14, wherein the photo menu further allows the user to choose between a first menu icon, the stored image of a left antler; a second menu icon, choose the stored image of a right antler; a third menu icon, capture the image of a left antler; or a fourth menu icon, capture the image of a right antler.

16. The system for measuring antler size of claim 13, wherein the main user interface displays images of past score cards that may be accessed.

17. The system for measuring antler size of claim 13, wherein the dark-colored background where the antler is placed prior to capturing the image comprises a black mat.

18. The system for measuring antler size of claim 13, wherein in response to receiving either the captured image or stored image, software on the server crops the uploaded photo from the dark-colored background.

19. The system for measuring antler size of claim 13, wherein in response to receiving either the captured image or stored image, software on the server crops a main beam and each tine of the antler from the main beam, which produces tine cropped images and a main beam cropped image, all cropped images are then compared to stored data on the cloud platform to produce length and circumference measurements.

20. The system for measuring antler size of claim 13, wherein the server comprises artificial intelligence to analyze the captured image or stored image.

* * * * *